A. K. STONE,

Assignor to R. S. TUCKER.

VEHICLE SPRING.

No. 7,298. Reissued Sept. 5, 1876.

WITNESSES.

O. O. Baldwin

Chas. M. O'Leary

Anson K. Stone

INVENTOR.

N. PETERS, PHOTO-LITHOGRAPHER, WASHINGTON, D. C.

UNITED STATES PATENT OFFICE.

ANSON K. STONE, OF ORONOCO, MINNESOTA, ASSIGNOR TO ROBERT S. TUCKER, OF FLUSHING, NEW YORK.

IMPROVEMENT IN VEHICLE-SPRINGS.

Specification forming part of Letters Patent No. 63,669, dated April 9, 1867; reissue No. 7,298, dated September 5, 1876; application filed August 18, 1876.

*To all whom it may concern:*

Be it known that I, ANSON K. STONE, of Oronoco, in the county of Olmsted and State of Minnesota, have invented a new and useful Improvement in Wheel-Carriages; and do hereby declare the same to be fully described in the following specification, and represented in the accompanying drawings, of which—

Figure 1:
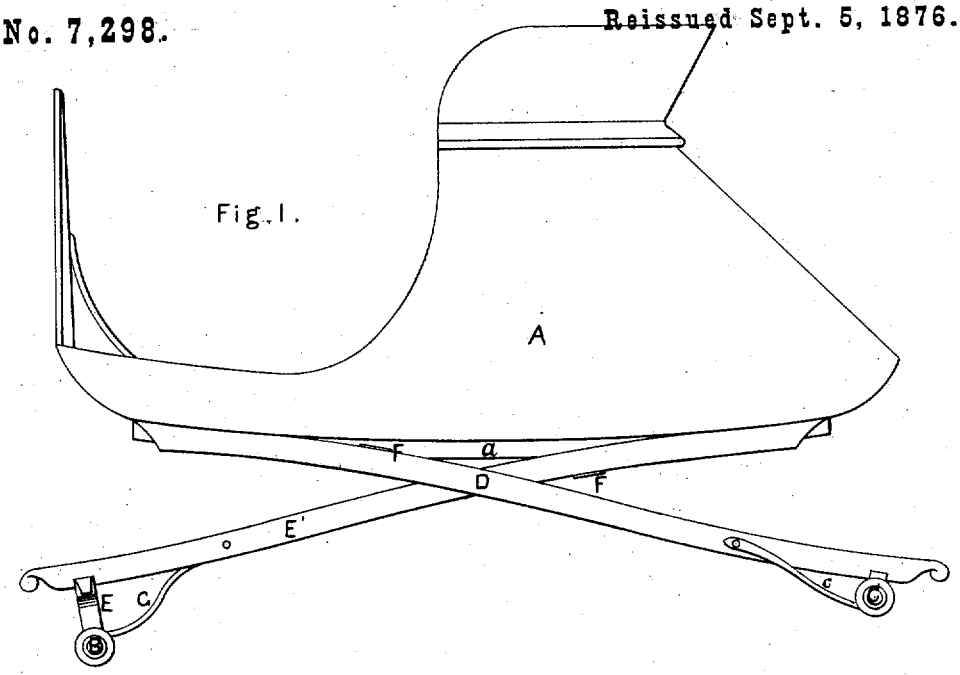
Figure 2:
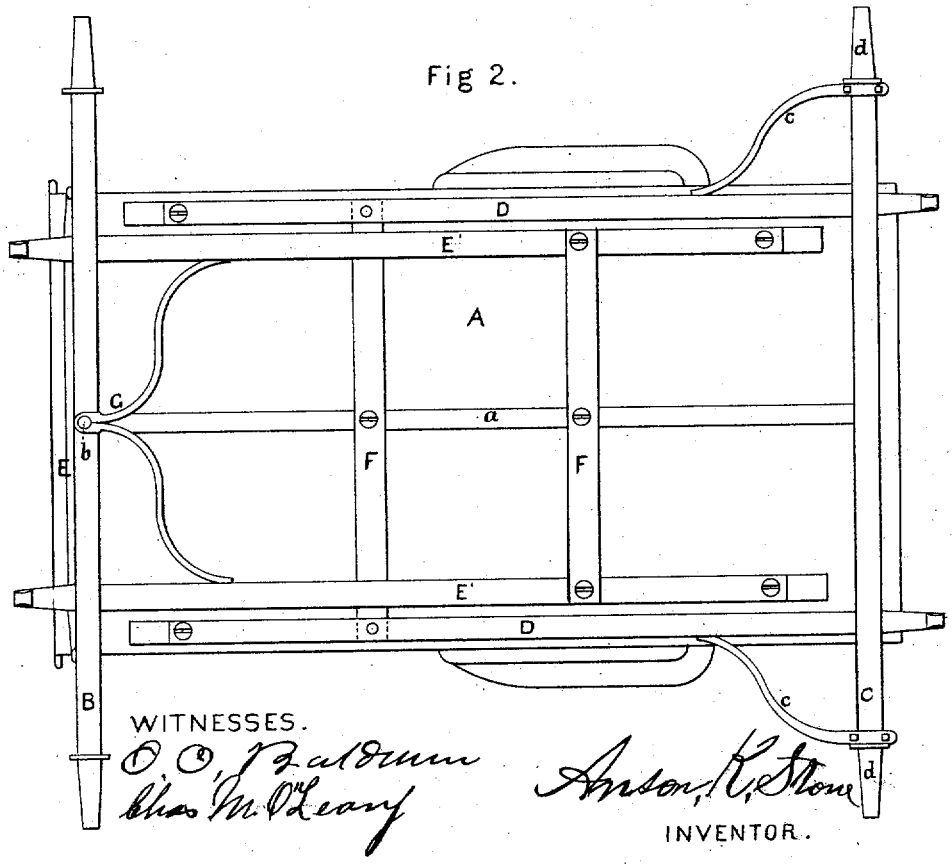

Figure 1 denotes a side elevation; and Fig. 2 a plan from the under side of a carriage-body with my invention applied to it.

In the drawings, A denotes the body of a common pleasure-wagon, B the front axle, and C the rear axle, thereof. The rear axle C is connected with the body A by means of two wooden springs or bars, D D, extending from the axle at right angles. These springs or bars are bolted to the axle near one end of each of them. At or near their other ends they are bolted to the carriage-body. The sweep-bar E of the front axle is also connected to the body A by two other springs, E′ E′, the connection of such springs with the said bar and body being like that of the first two springs with the rear axle and the body.

The two springs or bars D D cross the other two sets E′ E′, when both sets are used, and are arranged in other respects with regard to them in the manner as represented in the drawings.

Furthermore, each pair of said bars is connected with one or two auxiliary springs, F F, which, at their middles, are fastened to the carriage-body, or to a bar or brace, *a*, extending along and projecting from the bottom of such body. Each spring F at its ends is fastened to two of the main springs or bars, and is arranged with respect to them in manner as shown in Fig. 2. The king-bolt *b* of the front axle goes through the said axle, the sweep-bar and a brace, G, extending from the said bolt in two directions, and may be fastened to the two main springs D D. The rear axle is further supported by screws *c c*, which go from it near its journals *d d* to and are fastened to the two bars E′ E′, the same being as exhibited in Figs. 1 and 2.

The auxiliary springs not only answer their purpose as springs to aid in supporting the axles, but serve as braces for the main springs, which are arranged and applied to the axles and the carriage-body as specified, not only answer the purpose of springs, but as a perch, thus rendering unnecessary a perch as usually applied to the rear axle and sweep-bar of a carriage.

I therefore claim—

1. The above-described arrangement of the four main springs D D E′ E′ with each other, the carriage-body, the rear axle, and the sweep-bar of the front axle.

2. The auxiliary or transverse springs F F, interposed between the carriage-body and the side bars or springs D D or E′ E′, substantially as described.

ANSON K. STONE.

Witnesses:
CHAS. M. O'LEARY,
O. O. BALDWIN.